(12) United States Patent
Cooper

(10) Patent No.: US 7,212,210 B2
(45) Date of Patent: May 1, 2007

(54) METHOD AND APPARATUS FOR ENLARGING AN OUTPUT DISPLAY ON A DISPLAY

(75) Inventor: Neil A. Cooper, Newmarket (CA)

(73) Assignee: ATI Technologies Inc., Markham, Ontario (CA)

( * ) Notice: Subject to any disclaimer, the term of this patent is extended or adjusted under 35 U.S.C. 154(b) by 60 days.

(21) Appl. No.: 10/802,485

(22) Filed: Mar. 17, 2004

(65) Prior Publication Data

US 2005/0206656 A1    Sep. 22, 2005

(51) Int. Cl.
G06T 11/00 (2006.01)
(52) U.S. Cl. .................... 345/472; 345/660
(58) Field of Classification Search ............ 345/472, 345/660
See application file for complete search history.

(56) References Cited

OTHER PUBLICATIONS

James, "The Power of Pixels", 2003, Portrait Displays, Inc., pp. 1-5.*
"Windows XP and Liquid View", Oct. 19, 2001, pp. 1-4.*
Simpson, "Mastering WordPerfect 5.1 & 5.2 for Windows", 1993, SYBEX, pp. 137-151, 145-146, 1162.*
Foley et al., "Computer Graphics Principles and Practice", 1996, Addison-Wesley, pp. 11, 12, 38-39, 41-42, 127-131, 976-978.*

* cited by examiner

Primary Examiner—Almis Jankus
(74) Attorney, Agent, or Firm—Vedder, Price, Kaufman & Kammholz, P.C.

(57) ABSTRACT

A method and apparatus for enlarging an output display includes a message hook application capable of receiving a magnification event indicator, wherein the magnification event indicator includes a magnification factor. The method and apparatus further includes a character generator coupled to the message hook application wherein the character generator receives a text call from the message hook application. The character generator thereupon generates a magnified character set including a plurality of characters enlarged by the magnification factor. A display driver is coupled to the message hook application and the character generator, wherein the display driver receives the character set at the magnified font size and caches the character set. A direct draw surface is coupled to the display driver such that the direct draw surface receive one or more of the characters enlarged by the magnification factor.

20 Claims, 5 Drawing Sheets

METHOD AND APPARATUS FOR ENLARGING AN OUTPUT DISPLAY ON A DISPLAY

FIELD OF THE INVENTION

The present invention relates generally to video graphics processing and more specifically to magnification and/or enlargement of visual characters on an output display.

BACKGROUND OF THE INVENTION

In a typical computing system, a high resolution display device, such as a liquid crystal display ("LCD"), a cathode ray tube ("CRT") or any other suitable display device, problems arise regarding enlargement and magnification of characters. For example, a typical graphical user interface system operates below its optimum capabilities, such as a 17" CRT display utilizing 1024×768 resolution instead of its maximum possible resolution of 1600×1200. This is due in part because most applications were written for use with older hardware and they become too hard to see due to being too small when a large resolution is used.

A current solution is allowing a user to zoom an entire desktop, as found within ATI products such as the HydraVision product. Although this solution does not give the end user proper control over the enlargement and does not provide the option of anti-aliased two dimensional rendering. Other alternate solutions include applications such as Microsoft Magnifier available from Microsoft, Inc., Zoomtext available from AISquared, Liquidview available from Portrait Display Systems and Zoom+ available from Gypsysoft. These current magnification systems work by creating off screen bitmaps and stretching pixels currently on the screen. These applications provide the end user a magnified output which is very blocky. In these cases, the magnification is based on taking each single pixel on the screen and magnifying the pixel by creating a block of N×N pixels on the magnified surface.

Therefore, there exists a need for a method and apparatus that allows for the enlargement and/or magnification of an output display by providing a smooth visual output.

DETAILED DESCRIPTION OF A PREFERRED EMBODIMENT

Generally, a method and apparatus for enlarging an output display includes a message hook application capable of receiving a magnification event indicator, wherein the magnification event indicator includes a magnification factor. The message hook application may be a module within a larger executable application, a physical hardwired processing element, such as an application specific integrated circuit, or any other suitable operation for performing the message hook application functions, as described below. The method and apparatus further includes a character generator coupled to the message hook application wherein the character generator receives a text call from the message hook application. The character generator thereupon generates a magnified character set including a plurality of characters enlarged by the magnification factor.

The method and apparatus further includes a display driver coupled to the message hook application and the character generator, wherein the display driver receives an ancillary text call indicator from the message hook application and the character set at the magnified font size from the character generator such that the display driver caches the character set.

The method and apparatus further includes a direct draw surface coupled to the display driver such that direct draw surface receives one or more of the characters enlarged by the magnification factor from the character set. Thereupon, through a frame buffer, the enlarged characters may be provided to an output display. Therein, the characters are generated at a magnified level using the character generator, thereby eliminating the magnification and the blocky visual output of prior art solutions.

Figure 1:
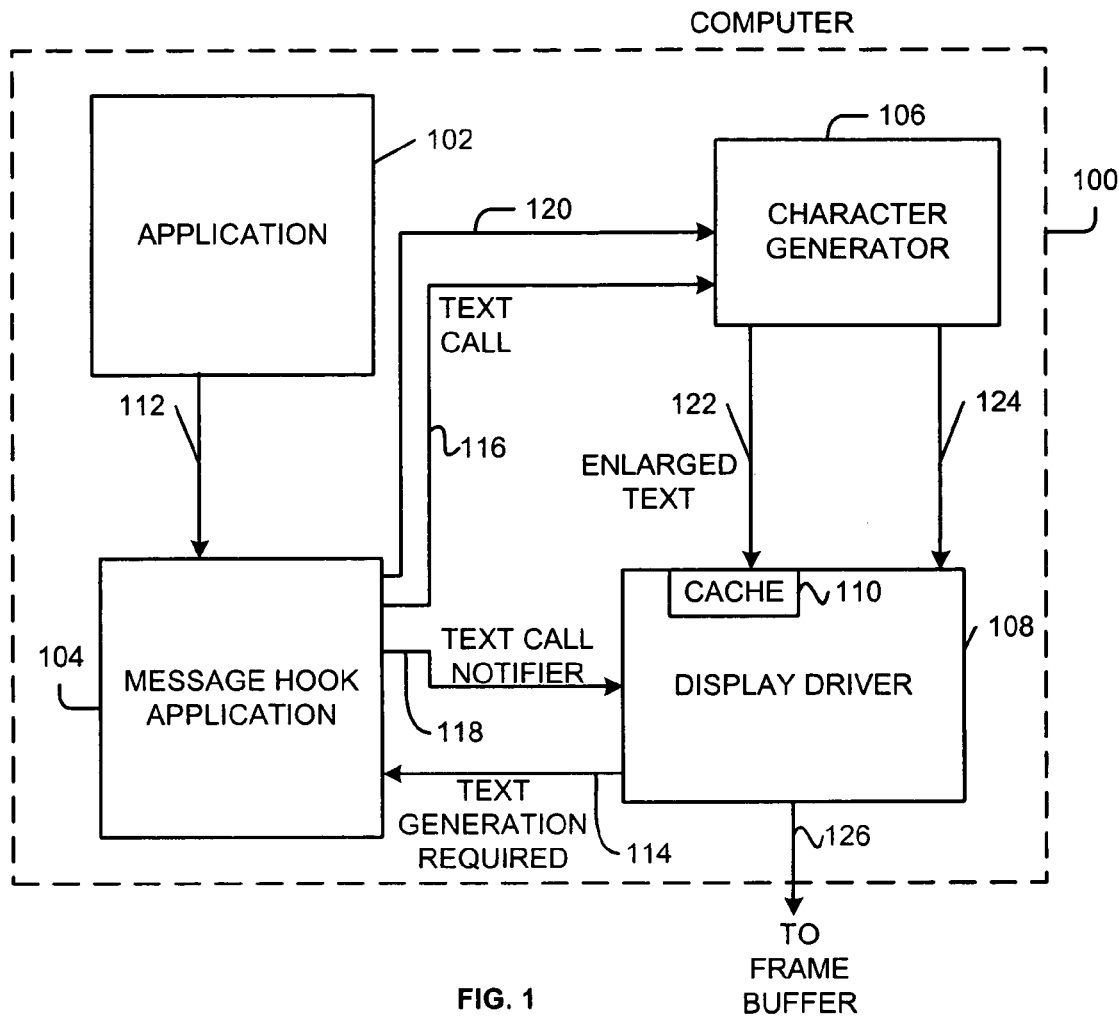
FIG. 1 illustrates a schematic block diagram of a computing environment in accordance with one embodiment of the present invention.

More specifically, FIG. 1 illustrates a computer system 100 in accordance with one embodiment of the present invention. The computer system 100 includes an application 102 which may be a software based application being executed on a host processor, such as but not limited to a word processing application, a spread sheet application, a presentation application or any other suitable application recognized by one having ordinary skill in the art. The computer system 100 further includes a message hook application 104, a graphics display interface 106, a display driver 108 and a cache 110, which in one embodiment may be disposed within a display driver 108.

The message hook application, in one embodiment, intercepts all standard graphical user interface events responsible for window creation, such as command signal 112, destruction and activation. These are interface portion of the message hook application 104 that allow the user to specify what types of windows they would like to respond to this feature. The user interface of this application 104 allows user specification of other special effects to apply to these windows also.

In one embodiment, the application 102 provides the input command signal 112, wherein the input command signal may be any type of command for a window display, including window sizing, generation, and activation. When text is rendered that originates from an application to be magnified 102, the display driver 108 notifies 114 the message hook application 104 that an enlarged font is required. The message hook application 104 further generates a text call 116 to the character generator 106 and a text call notifier 118 to the display driver 108. The character generator 106 receives a character display command including a magnification factor 120 from the message hook application 104. In response to the text call 116, the character generator generates a magnified character set which includes a plurality of character enlarged by the magnification factor 120.

In one example, a standard font, such as Times New Roman, a character set may be generated for a particularly larger font size, such as a size 36 font which would be a factor of three times larger than a standard 12 font. Therefore, in the event that a window is enlarged by a factor of 3, the 36 font may be used for the display characters instead of magnifying the 12 font characters by a factor of 3.

The text call 116 indicates for the character generator 106 to generate the magnified character set and the text call notifier 118 notifies the display driver 108 that the text call 116 was for generating the enlarged character set and not a display command.

Thereupon, in one embodiment of the present invention, the character generator 106 provides the enlarged character set 122 to be stored in the cache 110 associated with the display driver 108. Furthermore, the character generator 106 may provide a display command 124 to a display driver 108 such that the display driver may provide a visual output.

The display driver 108 provides a series of interface functions that allow the message hook application 104 to specify when rendering output should be redirected. When rendering redirection is enabled, the display driver 108 creates surfaces in either a frame buffer (not shown) or in an alternative memory (not shown) that will become the target of all renderings instead of the primary display. Subsequent rendering commands from the application 102 will be redirected to these alternate surfaces. The display driver 108 further interfaces with a redirected surface renderer and a mouse filter, as discussed in further detail below. If rendering text, the font used for rendering will then be substituted with the entry from the display driver 108, scaleable font within the cache 110. Other rendering will simply be scaled up, such as icons or other graphics. The rendering to an off screen surface may be done such that the off screen surface is maintained at a largest available magnification level to maintain good font quality when zooming and thereupon reduces the appearance of pixelation with conventional zooming.

A redirected surface renderer establishes an interrupt on a vertical blanking field. The redirected surface renderer may be implemented as an extension to a miniport and the display driver 108 components. Upon receipt of an interrupt, any redirected surfaces that have rendering done to it since the last interact will be copied to a desktop surface. The method of copying to the desktop will be determined by user specified settings from the message hook application 104, in one embodiment. As well as specifying various degrees of magnification, a user may be able to specify special effects such as stretching, anti-aliasing or pixel shading to apply when copying surfaces.

Figure 2:
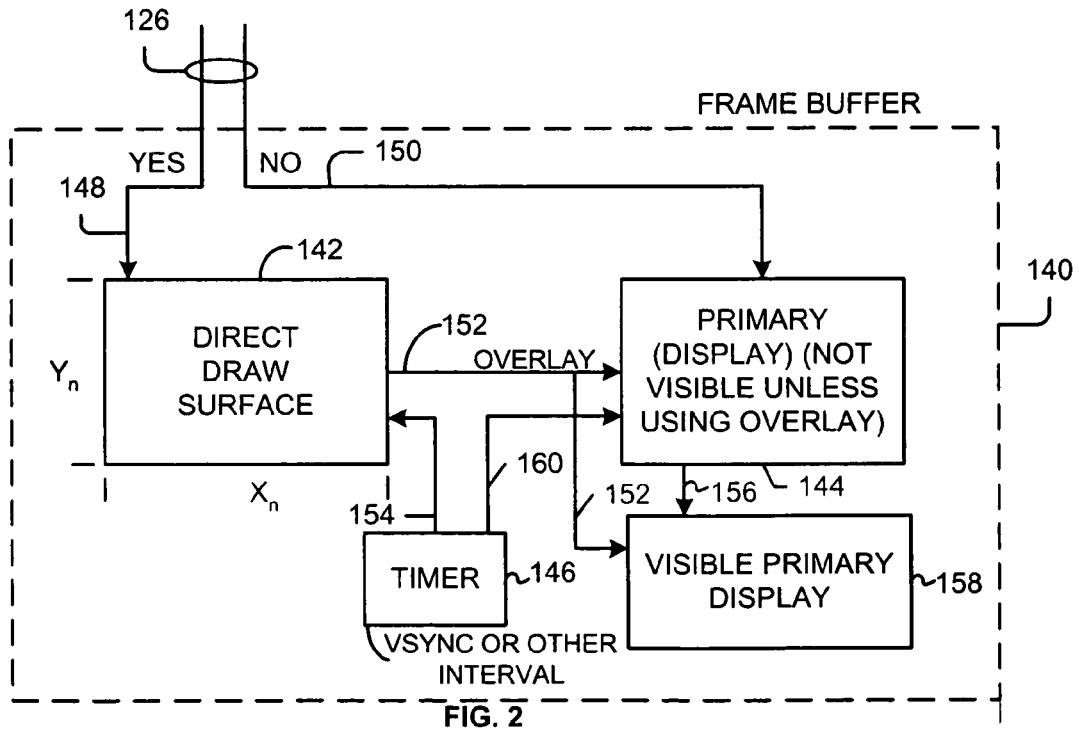
FIG. 2 illustrates a schematic block diagram of a frame buffer in accordance with one embodiment of the present invention.

Thereupon, the display driver 108 is operatively coupled to a frame buffer, as discussed below in FIG. 2, and provides an output signal 126 thereto. In accordance with one embodiment of the present invention, FIG. 2 illustrates a frame buffer 140 having a direct draw surface 142 and a primary memory 144. The frame buffer 140 further includes a timer 146 which may be implemented in hardware, software or any other suitable combination thereof. The frame buffer 140 receives the output command 126 from the display driver 108 which may include a yes signal 148 or a no signal 150. The yes signal 148 directs rendering to the direct draw surface 142 and the no signal 150 directs rendering to the primary memory 158 or to a non-visible copy of the primary 144 if the direct draw surface 142 is not an overlay. In the event that the yes signal 148 is provided from the display driver 108, this indicates that a magnification has occurred and that the rendering of the window is to include the enlarged characters from the magnified character sets. Based on a scale factor of n, as illustrated in the direct draw surface 142 having dimensions of y×n and x×n, the direct draw surface emulates a full frame of an image. If the direct draw surface 142 is created as an overlay surface the origin of the overlay is maintained to display over the appropriate region of the visible primary display, otherwise a dirty region is defined as a rectangle within the direct draw surface 142 that needs to be copied to the visible primary display 158.

In one embodiment, the timer 146 periodically checks if there is the presence of a dirty region. With the presence of a dirty region, the timer generates a copy command 154 to the direct draw surface to thereupon provide the copy 152 to the visible primary display 158 and a copy command 160 to the non-visible primary 144 to thereupon provide the copy 156 to the visible primary display 158. In one embodiment, the timer periodically checks on a millisecond basis or is set to trigger during the vertical blanking interval.

Figure 3:
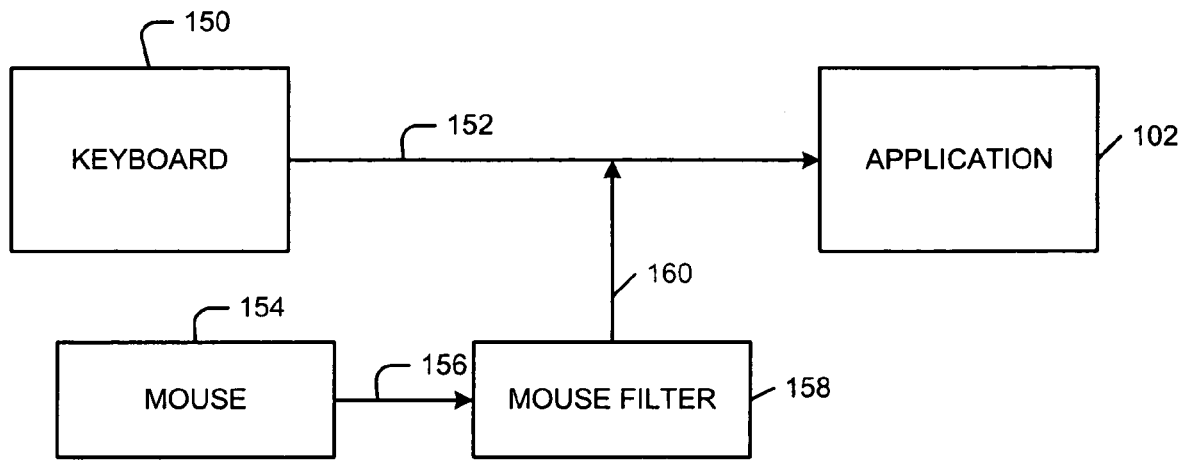
FIG. 3 illustrates a schematic block diagram of the operation of a mouse filter, in accordance with one embodiment of the present invention.

FIG. 3 illustrates further functional blocks of elements for processing with the application 102 of FIG. 1. A keyboard 150 is utilized to provide user input command 152 to the application 102, a mouse 154 is used to provide cursor command 156 which is intercepted by a mouse filter 158. The mouse filter 158 may thereupon generate a redirected mouse input signal 160 which is provided as input to the application 102.

The mouse filter 158 may be implemented in hardware, software or a combination thereof and is responsible for the interception of all mouse inputs 156. In one embodiment, the mouse filter 158 may be included within current mouse filters found within standard processing systems. In the event an input 156 is done on an area of the desktop known to be part of a magnified, redirected surface, it is necessary to scale the clicked coordinates approximately before passing the mouse click message to the underlying application. The mouse filter component also processes user request to change the magnification of the redirected surfaces.

While the embodiment of FIG. 3 utilizes a mouse 154 in conjunction with a mouse filter 156, more generally the present invention includes an input command that is received by an input filter. The input filter operates, as noted above with respect to the mouse filter 156, to receive the incoming signal and generate the redirected input command. As noted above, when the image is scaled, the positioning and input from the input device is offset, therefore the filter corrects this visual offset. The input command may be received from any suitable input device, such as, but not limited to, a mouse (as noted above), a touchpad, a joystick, rollerball, a stylus, a digitizer or any other suitable input device as recognized by one having ordinary skill in the art. Moreover, the digitizer may be any suitable input device capable of generating a digital input signal, as recognized by one having ordinary skill in the art.

Figure 4:
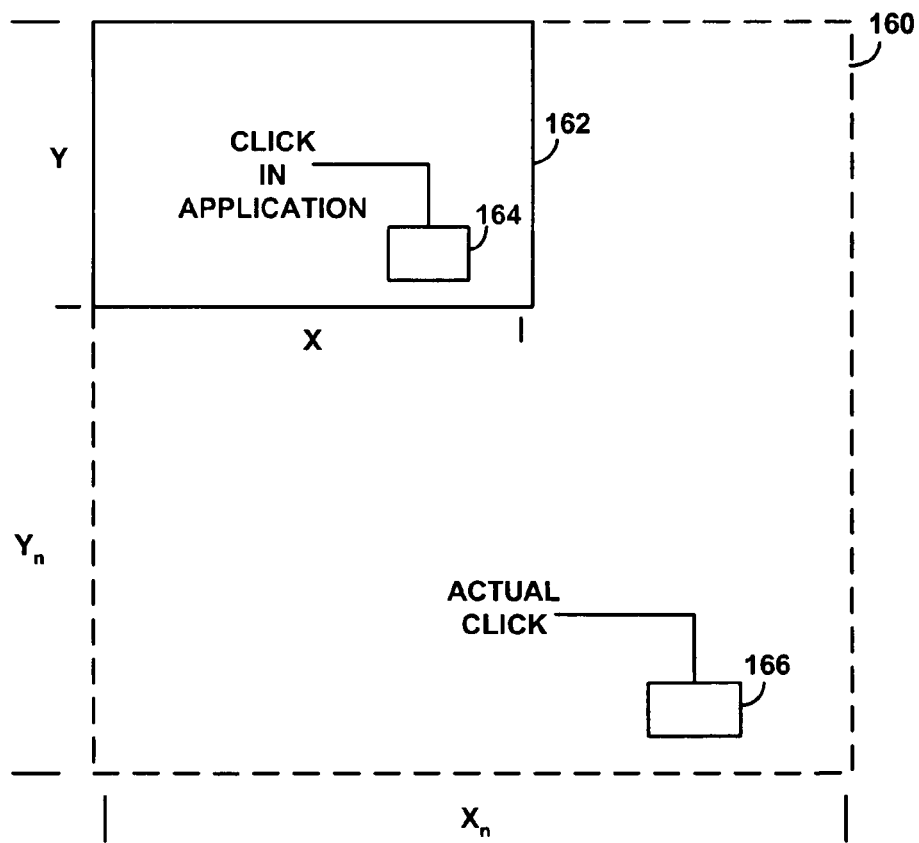
FIG. 4 illustrates a graphical representation of the offset of the magnification.

FIG. 4 illustrates graphical representation of the window display offset between windows, the magnified window 160 and the original window 162. As illustrated, the original window, 162 has the dimensions x and y and in large window 160 has dimensions x×n and y×n wherein the window was magnified by factor n.

Using a graphical user interface with a mouse input, the user may provide a click, depressing the input button on the mouse, at a specific location within the application running in window 162, illustrated on its location 164. Although, due to the magnification, the user may actually be clicking the mouse based on coordinates as indicated by the actual click 166. Therefore, the mouse filter 158 must redirect and offset the click coordinates in a magnified window.

The mouse filter may also process user request to change the magnification of the surface, such as generating magnified window 160 from window 162. In one embodiment, magnification may be performed by clicking a mouse button on the window title and dragging the window to increase or decrease the magnification of the window. In this embodiment, user interaction using the mouse 154 may cause commands to be sent to the redirected surface renderer for effectively calculating and resizing the window 160 from the original window 162.

The functional blocks of FIGS. 1–3 may represent executable program instructions, individual processors, application specific integrated circuits, digital signal processors, microprocessors, firmware, microcontrollers, state machines, or any other recognized operational component capable of executing program instructions where the programming instructions may be disposed on a ROM, RAM, EEPROM, compact disc, digital versatile disc, optical medium or any other volatile or non-volatile storage medium.

Figure 5:
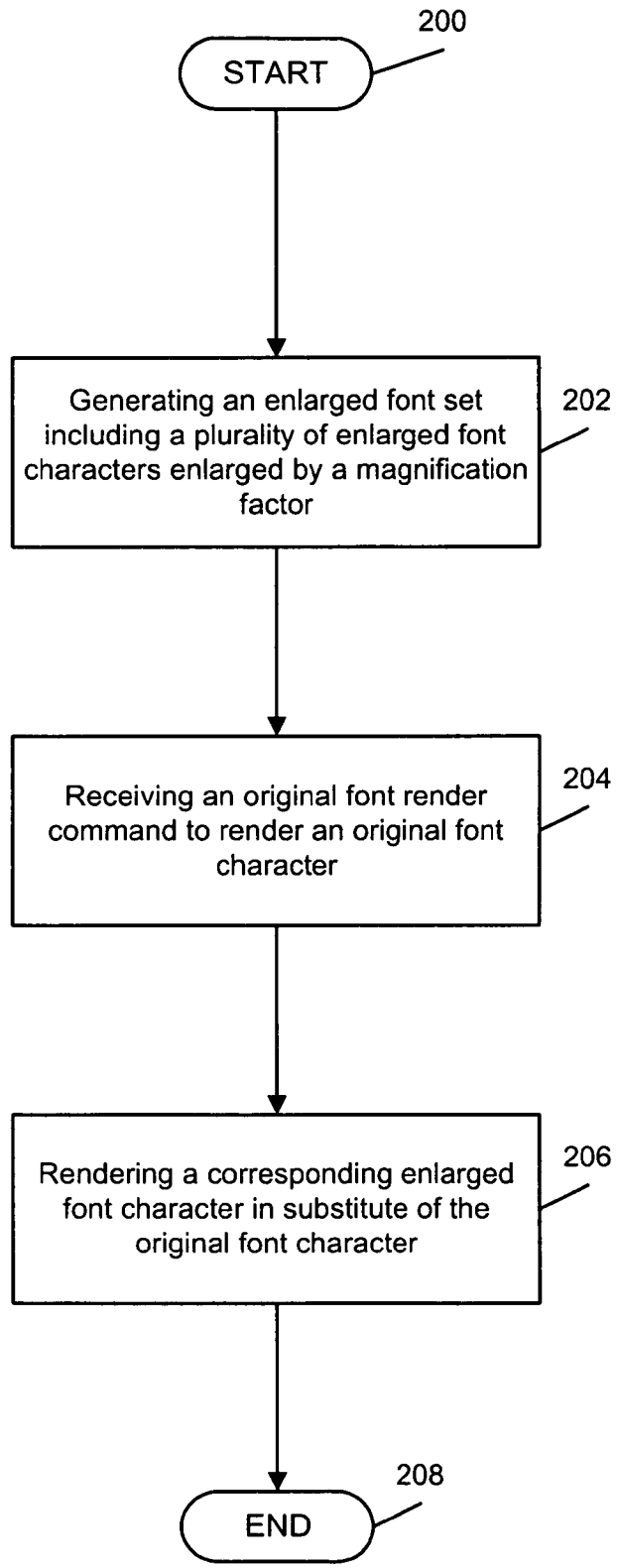
FIG. 5 illustrates a flow chart of a method for enlarging an output display, in accordance with one embodiment of the present invention.

FIG. 5 illustrates the steps of a method for enlarging an output display. The method begins, 200, by generating an enlarged font set including a plurality of enlarged font characters enlarged by a magnification factor, step 202. As discussed above with regards to FIG. 1, the character generator 106 generates the enlarged font set. The next step step 204, is receiving an original font render command to render an original font character. Once again, with respect to FIG. 1, an original font render command 120 may be provided from the application 102.

Thereupon, the next step is rendering a corresponding enlarged font character and substitute of the original font character, step 206. As discussed above, the rendering may be done on a redirected rendering surface in conjunction with the display driver 108. Thereupon, the method is complete and an enlarged output display is generated upon an output render command providing it to an output display through a frame buffer.

Figure 6:
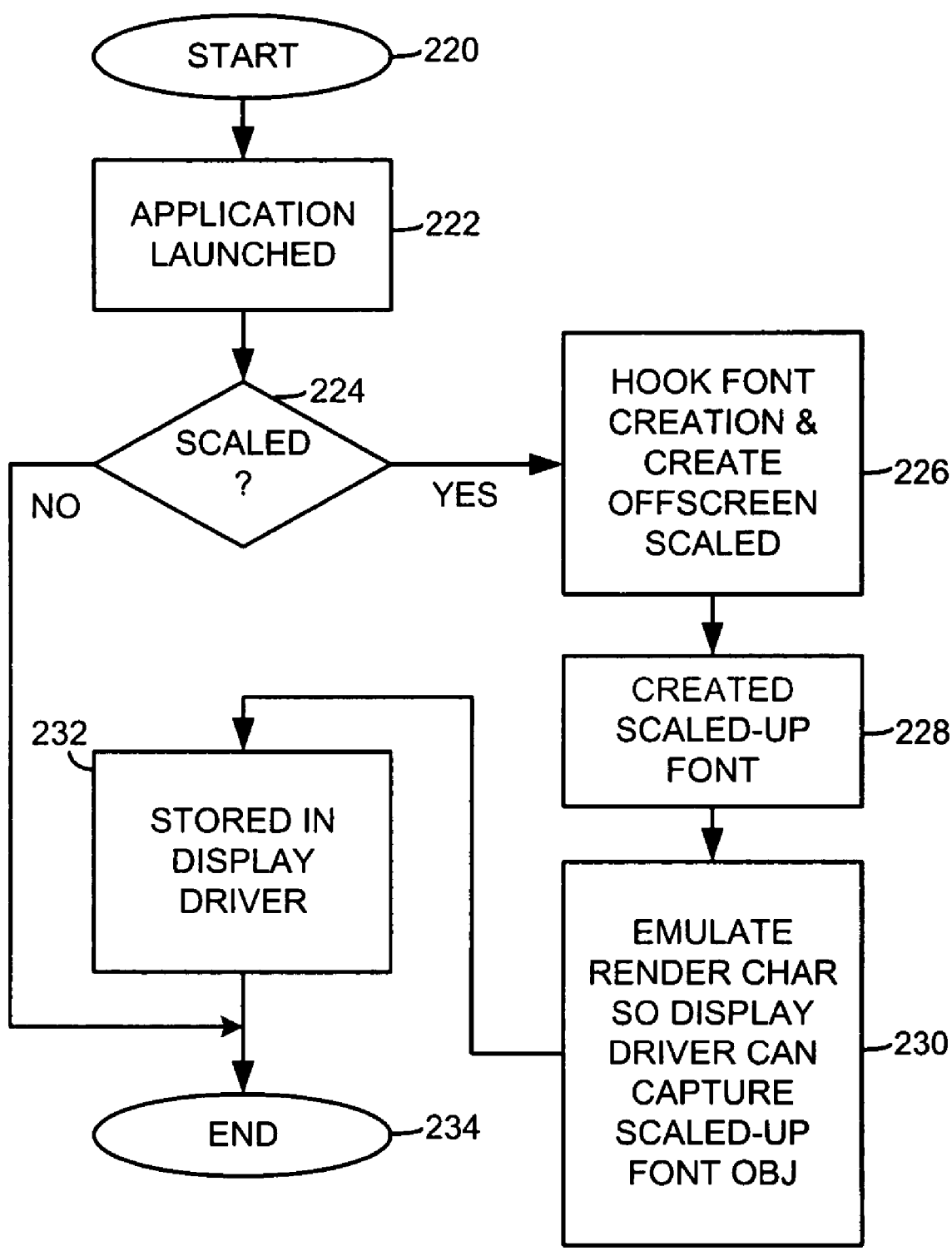
FIG. 6 illustrates another flow chart of a method for enlarging an output display, in accordance with one embodiment of the present invention.

FIG. 6 illustrates the steps of one embodiment of a method for enlarging an output display. The method begins, step 220, when an application is launched, step 222. As discussed above, the application may be any suitable application, such as a word processing application, a spreadsheet application, or any other suitable application for use by a user on a computing processing system. A first determination is made if the screen in which the application is displayed has been scaled, step 224.

In the event that the screen has been scaled, the next step is to utilize the message hook application to generate a font set and to create an offscreen scaled version, step 226. Thereupon, a scaled up font is created, step 228. For example, if the screen is scaled by a factor of N, the scaled up font is generated by at least the factor of N, but another embodiment may be increased by a larger or smaller factor and therein resized to accommodate the visual display screen and memory requirements.

The next step, step 230, is to emulate rendering characters so the display driver can capture the scaled up font object. In one embodiment, this may be performed by the message hook application sending a text call notifier to the display driver. Thereupon, the enlarged text is stored in the display driver, step 232. In one embodiment, the enlarged text is stored within a cache within the display driver. Thereupon, the method is complete, step 234. Furthermore, in step 224, in the event the application is not scaled, the method proceeds to the conclusion step 234.

Figure 7:
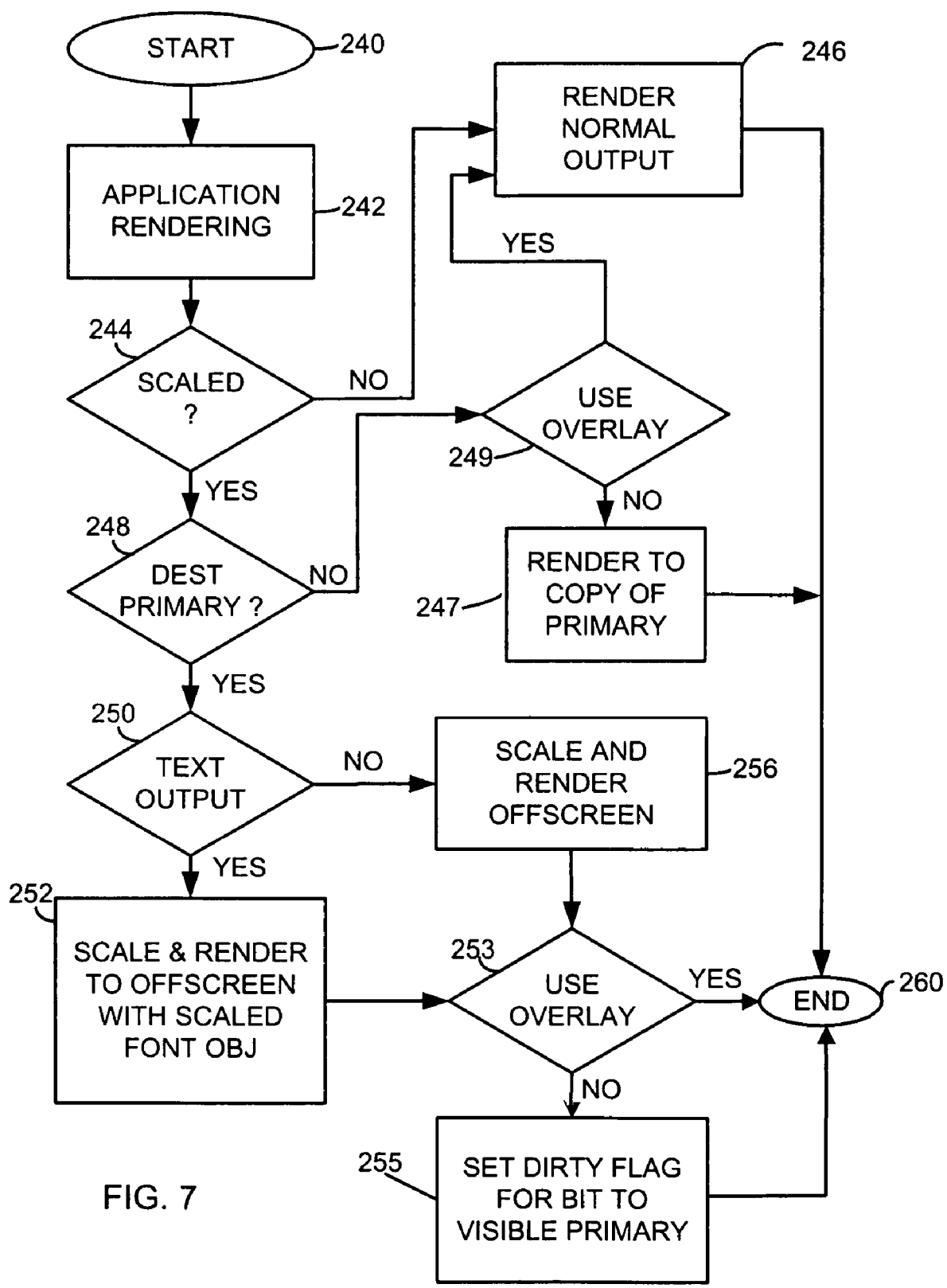
FIG. 7 illustrates a flow chart of the steps of a method for enlarging an output display, in accordance with one embodiment of the present invention.

FIG. 7 illustrates another embodiment of the method for enlarging an output display in accordance with one embodiment of the present invention. The method begins, step 240, by the performance of an application rendering, step 242. The step may be performed once an application seeks to provide a visual display output, for example in a word processing application with the user typing text on a keyboard. A first determination is made if the visual display has been scaled, step 244. In the event that scaling has not occurred, the next step is to render the normal output, step 246. If the application has been scaled, step 244, the next step is to determine if it is to be written to a primary destination, step 248. If it has been scaled and is not written to the primary destination, step 249, typically the display screen, the method proceeds to step 246 where it renders a normal output if using overlays or renders to an invisible primary copy 247 if not using overlays.

If the application is scaled, step 244 and it is to the primary destination, step 248, a third determination is made if there is a text output, step 250. If there is a text output, the next step is to scale and render to an offscreen with the scaled font object, step 252. The step may be performed in accordance with the offscreen rendering as discussed above, the method thereupon proceeds to step 253 wherein a dirty region defining a required bit is defined for rendering to the primary display 254 in the event that the offscreen surface is not overlayed.

In the event of step 250 that there is no output, the method proceeds to step 256 which includes a scale and rendering offscreen. The method then proceeds to step 253 wherein a dirty region defining a required bit is defined for rendering to the primary display 255 in the event that the offscreen surface is not overlayed. Thereupon, the method is complete, step 260. Moreover, the method is complete upon the conclusion of step 246 of rendering a normal output in the event that either the application is not scaled, step 244 or the application is scaled and is written to a primary destination, step 248.

It should be understood that the implementation of other variations and modifications of the invention in its various aspects will be apparent to those of ordinary skill in the art, and that the invention is not limited by the specific embodiments described herein. For example, the cache 110 may be disposed at any location within the computer system 100 and not specifically or solely from the display driver 108. It is therefore contemplated to cover by the present invention any and all modifications, variations or equivalents that fall within the spirit and scope and the basic underlying principles disclosed and claimed herein.

What is claimed:

1. A method for enlarging an output display, the method comprising:
   generating an enlarged font set including a plurality of enlarged font characters enlarged by a magnification factor;
   receiving an original font render command to render an original font character; and
   while rendering an enlarged output display based on the magnification factor, rendering within the enlarged output display an enlarged font character from the enlarged font set in substitute of the original font character.

2. The method of claim 1 further comprising:
prior to generating the enlarged font set, receiving the magnification factor.

3. The method of claim 1 further comprising:
after generating the enlarged font set, storing the enlarged font set within a cache.

4. The method of claim 1 wherein rendering within the enlarged output display an enlarged font character from the enlarged font set is directed to an off-screen surface.

5. The method of claim 4 further comprising:
substituting the enlarged font rendering command for the original font rendering command; and
wherein rendering within the enlarged output display the enlarged font character from the enlarged font set in substitute of the original font comprises rendering the enlarged font character corresponding to the original font character in response to the enlarged font rendering command.

6. The method of claim 5 further comprising:
providing the enlarged font rendering command to a display driver redirector.

7. An apparatus for enlarging an output display, the apparatus comprising:
means for receiving a magnification event indicator, wherein the indicator includes a magnification factor;
means for receiving a text call from the means for receiving the magnification event indicator for the generation of a magnified character set including a plurality of characters enlarged by the magnification factor; and
means for receiving an ancillary text call indicator from the means for receiving the magnification event indicator, wherein the means for receiving the ancillary text call indicator is further operative to receive the magnified character set from the means for receiving the text call such that, in response to the ancillary text call indicator, the means for receiving the ancillary text call indicator is further operative to cache the magnified character set.

8. The apparatus of claim 7, wherein:
the means for receiving the magnification event indicator is further operative to receive an input command signal; and
the apparatus further comprises memory comprising a direct draw surface, wherein the memory is operably coupled to the display driver such that the memory is operative to receive one or more characters of the magnified character set, and wherein the one or more characters of the magnified character set is stored in the direct draw surface.

9. The apparatus of claim 8 further comprising:
an input filter device operative to receive an input command and thereupon generate a redirected input command.

10. The apparatus of claim 9 wherein the input command is received from at least one of the following: a mouse, a touchpad, a joystick, a rollerball, a stylus, a touchscreen and a digitizer.

11. The apparatus of claim 7 further comprising:
a frame buffer operably coupled to the display driver operative to receive the magnified character set such that the frame buffer is operative to provide the magnified character set to a display device.

12. The apparatus of claim 8 further comprising:
a timing device capable of resetting the means for receiving an ancillary text call indicator and the magnified character set.

13. A computer system comprising:
at least one storage medium including executable instructions associated with a message hook application, a character generator and a display driver; and
one or more processors operatively coupled to the at least one storage medium, wherein the one or more processors are operative to execute the executable instructions associated with the message hook application, the character generator and the display driver, wherein:
the one or more processors is operative to receive a magnification event indicator and an input command signal, wherein the indicator includes a magnification factor;
the executable instructions associated with the massage hook application, when executed by the one or more processors, causes the one or more processors to generate a text call for the generation of a magnified character set;
the executable instructions associated with the character generator, when executed by the one or more processors, causes the one or more processors to generate the magnified character set in response to the text call, wherein the magnified character set includes a plurality of characters enlarged by the magnification factor;
the executable instructions associated with the message hook application, when executed by the one or more processors, further causes the one or more processors to generate an ancillary text call indicator;
the executable instructions associated with the display driver, when executed by the one or more processors, causes the one or more processors to cache the magnified character set in response to the ancillary text call indicator; and
memory comprising a direct draw surface, wherein the memory is operably coupled to the one or more processors such that the memory is operative to receive one or more characters of the magnified character set and store in the direct draw surface the one or more characters of the magnified character set.

14. The computer system of claim 13 further comprising:
an input filter device operative to receive an input command and thereupon generate a redirected input command.

15. The computer system of claim 14 wherein the input command is received from at least one of: a mouse, a touchpad, a joystick, a rollerball, a stylus, a touchscreen and a digitizer.

16. The computer system of claim 14, further comprising a display device operatively coupled to the memory wherein the display device is operative to receive the one or more characters of the magnified character set for display.

17. The method of claim 1, wherein the output display corresponds to a window and the rendering of the enlarged output display corresponds to rendering an enlarged window.

18. A computer system to implement a graphical user interface ("GUI") on a display device, the apparatus comprising:
at least one storage medium including executable instructions associated with a character generator and a display driver; and
one or more processors operatively coupled to the at least one storage medium, wherein the one or more processors are operative to execute the executable instructions associated with the character generator and the display driver, wherein:

the one or more processors is operative to receive a command to enlarge a window of the GUI by a magnification factor, wherein the window of the GUI includes text;

the executable instructions associated with the character generator, when executed by the one or more processors, causes the one or more processors to generate enlarged text corresponding to the text associated with the window of the GUI, wherein the enlarged text has a size corresponding to the factor; and the executable instructions associated with the display driver, when executed by the one or more processors, causes the one or more processors to enlarge the window of the GUI by an amount corresponding to the magnification factor and further operative to replace text associated with the window with the enlarged text.

19. The computer system of claim 18, wherein the executable instructions associated with the display driver, when executed by the one or more processors, further causes the one or more processor to enlarge graphical content associated with the window by an amount corresponding to the magnification factor.

20. The computer system of claim 18, wherein the one or more processors is operatively coupled to receive the command to enlarge the window of the GUI from at least at least one of: a mouse, a touchpad, a joystick, a rollerball, a stylus, a digitizer and a keyboard.

* * * * *